W. H. Smith,
Rotary Plane.

N° 23,870. Patented May 3, 1859.

Witnesses:
John R. Caswell
By B. Howland

Inventor:
Wm H Smith

UNITED STATES PATENT OFFICE.

WILLIAM H. SMITH, OF NEWPORT, RHODE ISLAND.

ROTARY PLANING-MACHINE.

Specification of Letters Patent No. 23,870, dated May 3, 1859.

*To all whom it may concern:*

Be it known that I, WILLIAM H. SMITH, of Newport, in the county of Newport and State of Rhode Island, have invented new and useful Improvements in Wood-Planing Machines; and I do hereby declare that the following is a full, clear, and exact description of the same, reference being had to the annexed drawings, making a part of this specification, in which—

Figure 1:
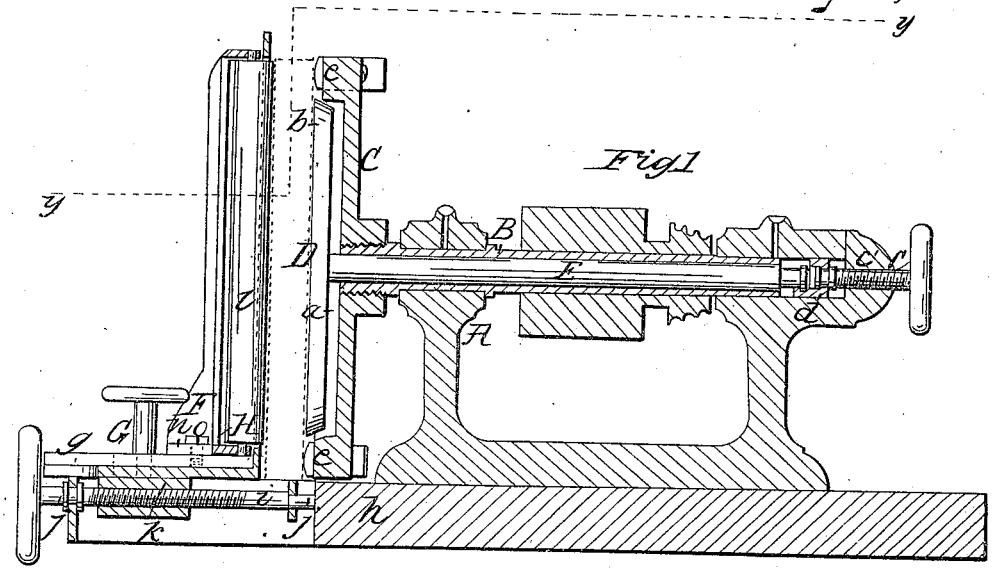
Figure 2:
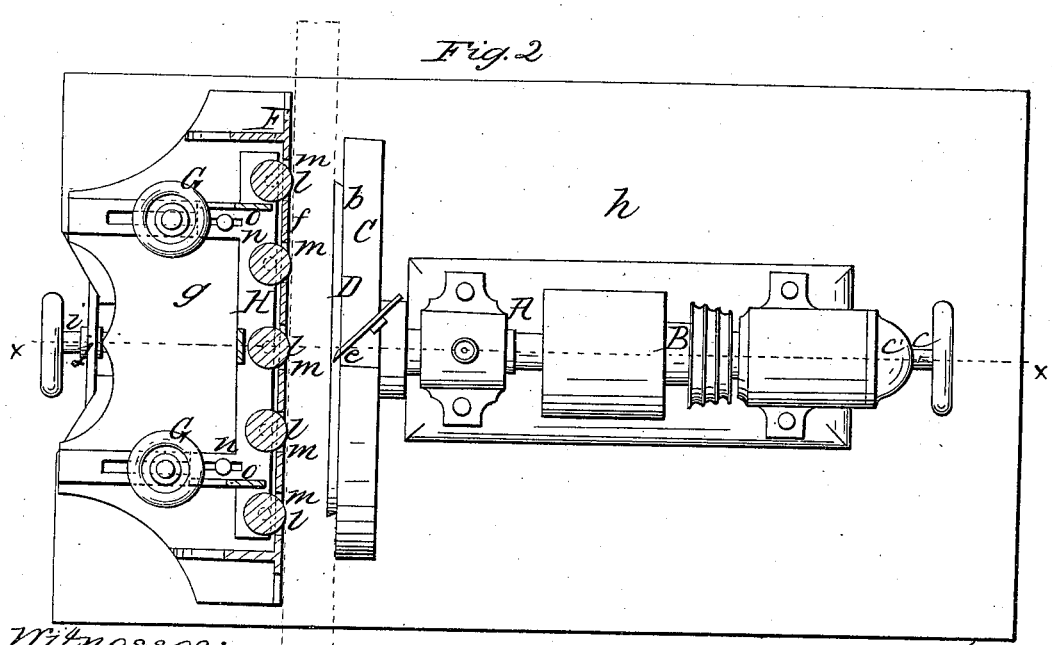

Figure 1, is a side sectional view of my invention $x$, $x$, Fig. 2, indicating the plane of section. Fig. 2, is a horizontal section of the same $y$, $y$, Fig. 1, indicating the plane of section.

Similar letters of reference indicate corresponding parts in the two figures.

This invention relates to a certain improvement in that class of wood planing machines in which cutters are attached to the periphery of a rotating disk or cutter head which is used in connection with a gage.

The object of the within described invention is to adapt the above class of planing machines to various kinds of work, so that the same machine will be rendered capable of doing fine or finished work for joinery, and also rendered capable of roughing off heavy coarse work.

The invention consists in having the cutter head or disk provided with a circular concentric recess in which a circular bearing plate is placed, said plate being attached to a shaft which is fitted loosely in the arbor of the cutter head, and has an adjusting screw attached to its outer end.

To enable those skilled in the art to fully understand and construct my invention I will proceed to describe it.

A, represents a cast metal head, in which a hollow arbor B, is placed, and allowed to rotate freely. On one end of this arbor a circular head or disk C, is placed. This head or disk may also be of cast metal and it has a circular recess $a$, made concentrically in its face side, as shown clearly in Fig. 1. Within the recess $a$, a circular plate D is placed. This plate D, has a beveled periphery $b$, and it is attached to a shaft E, which is fitted loosely in the arbor B, the shaft being allowed to slide longitudinally therein and moved or adjusted by a screw $c$, which is fitted in a nut or female screw $c'$, in the end of the head A. The screw $c$, is attached to the end of the shaft E, by means of a swivel clutch $d$, as shown clearly in Fig. 1, said clutch forming the necessary connection and also permitting the shaft E, to turn if necessary with the arbor B.

To the periphery of the cutter head C, cutters $e$, $e$, are attached, the cutting edges of which project horizontally from the head or disk, C.

F, is a gage which is formed of an upright fence or plate $f$, attached to a base $g$, which is placed on the bed $h$, of the machine. The fence or plate $f$, is placed parallel with the face of the plate D, and it may be adjusted nearer to or farther from the plate D, by means of a screw $i$, which is fitted in proper bearings $j$, in the bed $h$, and passes through a nut $k$, attached to the base $g$, see Fig. 1. Through oblong slots in the base $g$, set screws G, pass in order to secure the fence at any desired point within the range of its movement.

To the base $g$, of the fence or plate $f$, an adjustable frame H, is attached. In this frame H, which is placed directly behind the fence or plate $f$, and parallel with it, vertical rollers $l$, are secured, and these rollers are in line with slots $m$, in the fence or plate $f$, as shown clearly in Fig. 2. The frame H, has a base $n$, which rests on the base $g$, of fence $f$, and the base $n$, has set screws $o$, passing through it to secure the frame H, at any desired point within the range of its movement. The fence $f$, and frame H, with its rollers $l$, extend as high as the cutter head or disk C, as shown clearly in Fig. 1.

The arbor B, is rotated by any proper means and the plate D, is adjusted farther in or out from the face of the head C, according to the thickness of the shaving to be taken off from the "stuff" to be planed, by turning the screw $c$, and the gage F, is adjusted to suit the thickness of the "stuff" by turning the screw $i$,—the set screws G, retaining the gage at the desired point. The stuff shown in red outline and designated by $j$, is fed by any proper feeding device between the gage F, and plate D, the cutters $e$, planing one side of the stuff. In case thick or heavy "stuff" is to be planed, that is "winding," that is to say, "stuff" the sides of which are not parallel, the frame H, is so adjusted that the rollers $l$, will receive the pressure of the "stuff" and reduce friction as the stuff is being fed to the cutters.

This machine may have its cutter head C, rotating in either a vertical or horizontal plane. When used for "roughing off" or planing heavy work the plate D, is withdrawn wholly within the recess $a$, and the machine then operates precisely similar to what is known as the "Daniels machine." The feature of having the plate D, adjustable gives the machine this character, and the rollers $l$, are used as a gage in the latter operation, that is to say in the "roughing off."

If the cutter head C, and plate D, are in a horizontal plane, the fence or plate $f$, and rollers $l$, occupy a similar position and perform the same function as when in a vertical position. The plate D, may rotate with the head C, or remain stationary according to the pressure to which it is subjected.

I am aware that cutter heads with cutters attached have been previously used, and I am also aware that adjustable gages have been used, but so far as I am aware, a central bearing plate D, has not been fitted concentrically in a cutter head so as to admit of the cutter head being placed in either a vertical or horizontal plane and at the same time admit of the adjustment of said plate D. I am also aware that adjustable gages have been employed in connection with rotating planers in order that "stuff" of different thicknesses may be planed on one and the same machine. I do not claim therefore an adjustable gage F, nor a rotary cutter head C,—neither separately nor in combination, but I do claim as new and desire to secure by Letters Patent—

The combination of the rotating cutter head C, with the central adjustable bearing plate D, arranged substantially as and for the purpose set forth.

WM. H. SMITH.

Witnesses:
JOHN R. CASWELL,
BY. B. HOWLAND.